United States Patent [19]

Gunnell

[11] 4,337,294
[45] Jun. 29, 1982

[54] RUBBER COVERED CARBON BLACK PELLETS

[75] Inventor: Thomas J. Gunnell, Bartlesville, Okla.

[73] Assignee: Phillips Petroleum Company, Bartlesville, Okla.

[21] Appl. No.: 145,908

[22] Filed: May 2, 1980

[51] Int. Cl.³ .......................... B32B 5/16; B32B 9/00
[52] U.S. Cl. .................................. 428/407; 428/408; 428/403; 427/221; 523/205; 523/318
[58] Field of Search .............. 428/403, 462, 367, 408; 260/42.14, 42.56, 42.47; 427/221

[56] References Cited

U.S. PATENT DOCUMENTS 2,457,963  1/1949  Thodos .
2,908,586  10/1959  Braendle ............................. 106/307

Primary Examiner—George F. Lesmes
Assistant Examiner—E. Rollins Buffalow

[57] ABSTRACT

Carbon black pellets are covered with rubber to prevent dusting problems. A process and apparatus for covering carbon black pellets with rubber is also disclosed.

6 Claims, 2 Drawing Figures

RUBBER COVERED CARBON BLACK PELLETS

The present invention relates to the production of dust free carbon black pellets. More specifically the present invention relates to the production of carbon black pellets having a cover which prevents the development of carbon black dust during the transportation and use of these carbon black pellets.

BACKGROUND OF THE INVENTION

Carbon black is used today in large quantities as a rubber reinforcement agent. Large quantities of carbon black are sold in the form of pellets which are agglomerates of carbon black particles held together by rather small forces. These pellets when filled into bags, emptied from these bags, or generally during any frictional contact among themselves, develop carbon black dust which is undesirable.

THE INVENTION

It is thus one object of this invention to provide a carbon black pellet which is essentially dust free.

A further object of this invention is to provide a dust free carbon black pellet which when used as a rubber reinforcement agent does not introduce any materials foreign to the rubber formulation.

Yet a further object of this invention is to provide a process for producing dust free carbon black pellets.

Still another object of this invention is to provide an apparatus for carrying out a process for producing dust free carbon black pellets.

Figure 1:
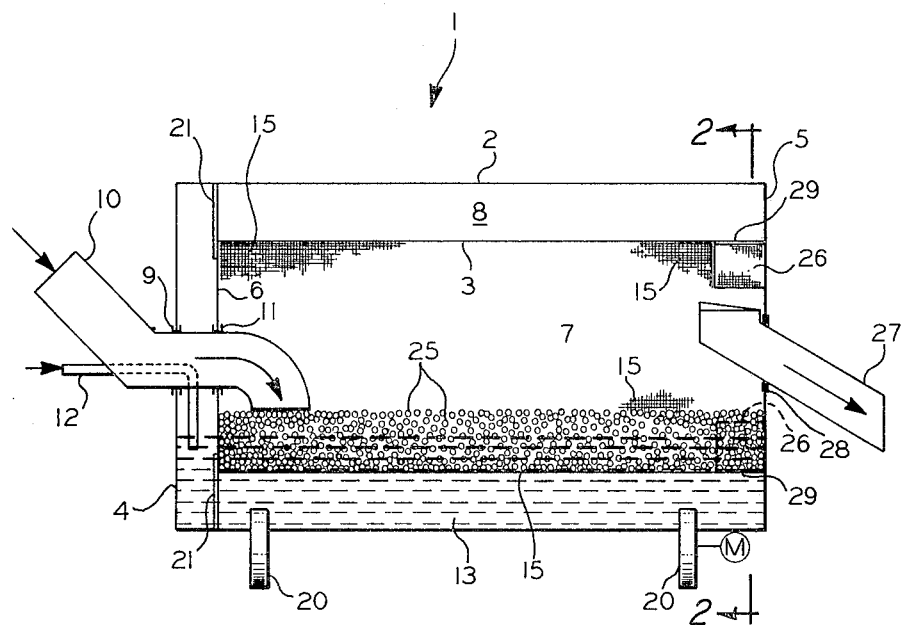
Figure 2:
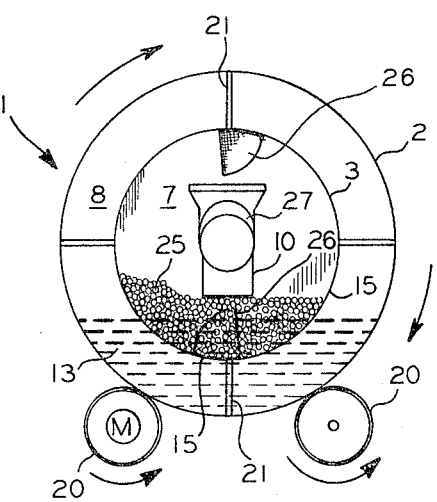

These and other objects, advantages, details, features and embodiments of this invention will become apparent to those skilled in the art from the following description of the invention, the appended claims and the drawing in which FIGS. 1 and 2 show schematical cross sections through an apparatus used in the production of the dust free carbon black pellets of this invention.

In accordance with this invention a dust free carbon black pellet is provided which consists essentially of a carbon black pellet core and a cover layer. The carbon black pellet core consists essentially entirely of carbon black and is substantially free of rubber. The cover layer is a layer of rubber surrounding the carbon black pellet core. The rubber preferably is of the same general nature as the rubber into which the carbon black pellet is eventually blended for reinforcement purposes.

The rubber surrounding the carbon black pellet core can basically be any rubber. Preferably the rubber is composed essentially of conjugated alkadiene polymers or copolymers. More specifically, the rubber can be made predominantly out of copolymers of one or more conjugated alkadiene monomers of 4 to 8 carbon atoms and one or more vinyl arene monomers of 8 to 12 carbon atoms.

Any cross linking of the rubber during the process of producing the carbon black pellet can be prevented by either covering the carbon black pellet at a temperature well under the cross linking temperature or by incorporating a cross linking inhibitor into the rubber emulsion or solution or melt. Thus, the carbon black pellet of this invention may contain in the rubber layer a cross linking inhibiting quantity of such an agent. Examples for such cross linking inhibiting agents are: phthalic anhydride, benzoic acid, salicylic acid and the like known "retarding" agents.

The rubber that is preferably used as the cover layer is one of relatively low molecular weight and narrow molecular weight distribution. More specifically the molecular weight of the rubber surrounding the carbon black pellet core is in the range of about 10,000 to about 2,000,000 usually about 50,000 to 250,000 (weight average molecular weight) and the molecular weight distribution of such a rubber is preferably in the range of about 1.1 to about 5.5 which can be determined as described in U.S. Pat. No. 4,104,326.

A second embodiment of this invention resides in a process for producing a rubber covered carbon black pellet. This process consists in coating the carbon black pellet core with a layer of rubber as defined above. This covering step can either be done by contacting the carbon black pellet core with a solution of the rubber in a solvent to form a layer of said solution on the carbon black core and thereafter evaporating said solvent from the layer or it can also be done by covering the carbon black pellet with a layer of molten rubber at a temperature well above the softening point of the rubber and thereafter cooling the so-covered pellet to a temperature well below the softening temperature, or it can also be done using a rubber-aqueous emulsion, and thereafter evaporating the water.

Typical solvents that can be used in connection with the solution covering embodiment are benzene, toluene, and xylene.

In the process variation using the layer of molten rubber the covering temperature will usually be in the range of about 175° to about 300° C.

In accordance with another embodiment of the invention there is provided an apparatus for carrying out the process. This apparatus comprises a rotatably arranged cylindrical chamber with an inlet for carbon black pellet cores. The chamber is confined by a wall which at least in part is porous and connected to a source of rubber solution, emulsion, or melt under pressure. The chamber is also provided with withdrawal means for withdrawing the carbon black pellets covered with the rubber layer. Preferably the apparatus comprises an outer solid cylinder and a porous concentric inner cylinder. The inlet means for the carbon black pellets are arranged for discharging the carbon black pellets into the inner porous cylinder whereas the feed means for injecting the rubber solution or rubber emulsion, or molten rubber, are arranged for injecting these fluids into the annular space between the outer cylinder and the concentric inner porous cylinder.

FIG. 1 shows a longitudinal cross section through the apparatus for coating the carbon black pellets with a rubber layer. The apparatus comprises a coating chamber 1 which is composed of an external cylinder 2 and a concentric internal porous cylinder 3. The external cylinder 2 is closed at the two ends by front and end plates 4 and 5, respectively. Similarly the porous cylinder 3 is closed at the front end by a front plate 6 and at the downstream end by the same end plate 5 as the external cylinder. This arrangement establishes two zones, namely an inner zone 7 inside of the porous cylinder 3 and an annular zone 8 between the porous cylinder 3 and the external cylinder 2.

An inlet conduit 10 is provided for which is usually stationary. Two rotary seals 9 and 11 allow the fluid tight rotation of the cylinders 2 and 3 around this stationary feed conduit 10. Through feed conduit 10 carbon black pellets are introduced into the zone 7 within the porous cylinder 3.

A feed line 12 is provided for injection of the pellet covering material into the zone 8. This material can for instance, as illustrative of the invention, be a rubber emulsion 13. In the drawing the rubber emulsion 13 is shown to be present only in the lower portion of the annular zone 8 but it is within the contemplation of this apparatus to inject the latex solution under a significantly higher pressure such as to fill up the entire zone and increase the flow of the rubber emulsion through the pores 15 of the porous cylinder 3. The porous cylinder 3 is constructed out of material such as carbon steel. The coating cylinder system 1 is supported on a set of motor driven rolls 20. The end of the porous cylinder 3 is supported within the surrounding cylinder 2 by brackets 21.

During the rotation of the cylinder system 1 carbon black pellets 25 introduced via line 10 into space 7 tumble and roll in contact with the porous inner surface of cylinder 3 and thereby get in contact with the rubber emulsion whereby these pellets are covered with rubber emulsion. At the downstream end of the cylinder perforated buckets 26 lift the coated carbon black pellets and discharge them into a stationary chute 27. A rotary seal 28 provides for a fluid tight rotation of the downstream end plate 5 and the stationary chute 28.

The rubber emulsion coated carbon black pellets from chute 27 are discharged into a flash tank (not shown) in order to evaporate any water from the surface of these pellets. Preferably the pellets are introduced into the chamber 7 at a reasonably high temperature to effect evaporation of the water after having been coated with the rubber emulsion during the travel of the pellets along the length of the porous cylinder 3. The evaporated water leaving with the pellets through chute 27 can be recovered, after separation from the pellets and reused in the formation of the rubber emulsion.

The rubber covered carbon black pellets are primarily useful as reinforcement agents in rubber compositions used for the production of tires, hoses, and the like. In such a production these rubber covered pellets are broken apart in the mixing step thus releasing the carbon black into intimate admixture with the main batch of rubber.

The buckets 26 preferably are pervious, e.g., made out of a fine mesh material so that excess rubber emulsion can drain and be removed from the bucket. The area where the bucket is in contact with the porous cylinder 3 is, however, impervious to avoid any additional flow of rubber emulsion onto the already formed covered carbon black pellets. This is indicated in the drawing by the solid support 29 of the buckets 26.

In the flash dryer or liquid evaporator the temperature is adjusted to essentially prevent any fusing of the rubber covered carbon black pellets.

The following example is intended to describe calculated data without undue limitation of the scope of this invention.

EXAMPLE

In this example ranges and specific examples for operating conditions and parameters for a carbon black pellet covering operation as shown in the drawings is given. The reference numerals in parentheses refer to the drawing.

| | Specific | Ranges |
|---|---|---|
| (10) Carbon Black Pellets: (Dried) | | |
| Pounds/hour, | 3,000* | — |
| Size range, mm, | 0.25 to 2.0 | — |
| Wt. % water, | 0.5* | — |
| Type of Black, ASTM, | N339 | — |
| Temperature, °F. | 300 | ambient to 350 |
| (12) Rubber Emulsion: | | |
| Pounds/hour, | 100 | 30 to 300 |
| Rubber concentration, wt. % rubber in emulsion | 5 | 1 to 10 |
| Pressure, psig, | 2 | 1 to 5 |
| Temperature, °F., | 125 | ambient to 200 |
| Composition: Styrene-butadiene rubber of 5 wt. % in water with conventional emulsifier as liquid | | |
| (27) Rubber-Coated Pellets (after drying, not shown): | | |
| Pounds/hour, | 3005 | — |
| Wt. % carbon black, | 99.3 | 98.5 to 99.4 |
| Wt. % rubber, | 0.2 | — |
| Wt. % water, | 0.5 | — |
| Weight ratio of rubber to carbon black in the product | | 0.0004:1–0.004:1 |
| Quality, | Dustless | |
| (2) Rotatable Shell: | | |
| Diameter, ft., | 6 | — |
| Length, ft., | 10 | — |
| RPM, | 12 | 10 to 15 |
| (3) Porous Liner: | | |
| Diameter, ft., | 5.5 | — |
| Length, ft., | 9.5 | — |
| Individual pore diameter, mm, | <0.25 | — |
| Total pore opening, square inches, | 3500 | 2000 to 6000 |
| Pore area/sq. ft., in$^2$/ft$^2$ | 21 | about 12 to about 36 |
| (25) Depth of Pellets, Inches, at rest: | 10 | 6 to 15 |
| Pressure within liner 3, psig, | −0.5 | 0 to −1 |
| Pressure in annulus (8), psig, | 3 | 1 to 10 |

Reasonable variations and modifications which will become apparent to those skilled in the art can be made in this invention without departing from the spirit and scope thereof.

I claim:

1. Dust free carbon black pellet consisting essentially of
    (a) a carbon black pellet core, which is substantially free of rubber
    (b) a layer of rubber surrounding said carbon black pellet core.

2. A pellet in accordance with claim 1 wherein said rubber is composed essentially of a conjugated alkadiene polymer or copolymer.

3. A pellet in accordance with claim 1 wherein said rubber is a copolymer of one or more conjugated alkadiene monomers of 4 to 8 carbon atoms and one or more vinylaromatic monomers of 8 to 12 carbon atoms.

4. A pellet in accordance with claim 1 comprising in said rubber a cross linking inhibitor in a quantity to substantially prevent cross linking of said latex during the covering and drying operation.

5. A pellet in accordance with claim 1 wherein said rubber is composed of molecules of low molecular weight and narrow molecular weight distribution.

6. Pellet in accordance with claim 1 wherein the carbon black pellet core consists essentially entirely of carbon black.

* * * * *